(12) United States Patent
Parambath et al.

(10) Patent No.: US 9,247,314 B1
(45) Date of Patent: Jan. 26, 2016

(54) CROSS-PLATFORM ELECTRONIC SHOPPING CART

(71) Applicant: Verizon Patent and Licensing Inc., Arlington, VA (US)

(72) Inventors: Jubish Cheriya Parambath, Chennai (IN); Mithun K. Thanneeru, Chennai (IN); Pradeep Chandramohan, Salem (IN); Sivaram Sundaram, Chennai (IN)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/499,374

(22) Filed: Sep. 29, 2014

(51) Int. Cl.
| | |
|---|---|
| *H04M 3/42* | (2006.01) |
| *H04N 21/81* | (2011.01) |
| *H04L 29/08* | (2006.01) |
| *H04N 21/2665* | (2011.01) |
| *H04N 21/2668* | (2011.01) |
| *H04N 21/258* | (2011.01) |
| *H04N 21/45* | (2011.01) |
| *H04N 21/222* | (2011.01) |
| *H04N 21/254* | (2011.01) |
| *G06Q 30/06* | (2012.01) |
| *H04N 21/475* | (2011.01) |

(52) U.S. Cl.
CPC ......... *H04N 21/812* (2013.01); *G06Q 30/0633* (2013.01); *H04L 67/10* (2013.01); *H04L 67/22* (2013.01); *H04N 21/222* (2013.01); *H04N 21/2542* (2013.01); *H04N 21/25891* (2013.01); *H04N 21/2665* (2013.01); *H04N 21/2668* (2013.01); *H04N 21/4532* (2013.01); *H04N 21/4751* (2013.01)

(58) Field of Classification Search
USPC ............................. 725/34, 35, 40; 455/414.1
See application file for complete search history.

(56) References Cited

U.S. PATENT DOCUMENTS

| | | | | |
|---|---|---|---|---|
| 8,380,177 | B2 * | 2/2013 | Laracey | ............. G06Q 30/0253 370/259 |
| 2011/0251892 | A1 * | 10/2011 | Laracey | ............. G06Q 30/0253 705/14.51 |

* cited by examiner

*Primary Examiner* — Kieu Oanh T Bui

(57) ABSTRACT

A network device receives selected items for an electronic shopping cart as selected by a user. The electronic shopping cart is associated with a first access network platform. The network device identifies an abandonment of the electronic shopping cart and stores the selected items associated with a user account for the user to create stored cart items. The network device receives a cart inquiry indicating that the user has accessed a second access network platform and associates the stored cart items with the user on the second access network platform. The network device determines a highest priority item of the stored cart items based on the second access network platform, generates promotional instructions for presenting the highest priority item to the user on the second network platform, and sends the promotional instructions to the second access network platform.

20 Claims, 8 Drawing Sheets

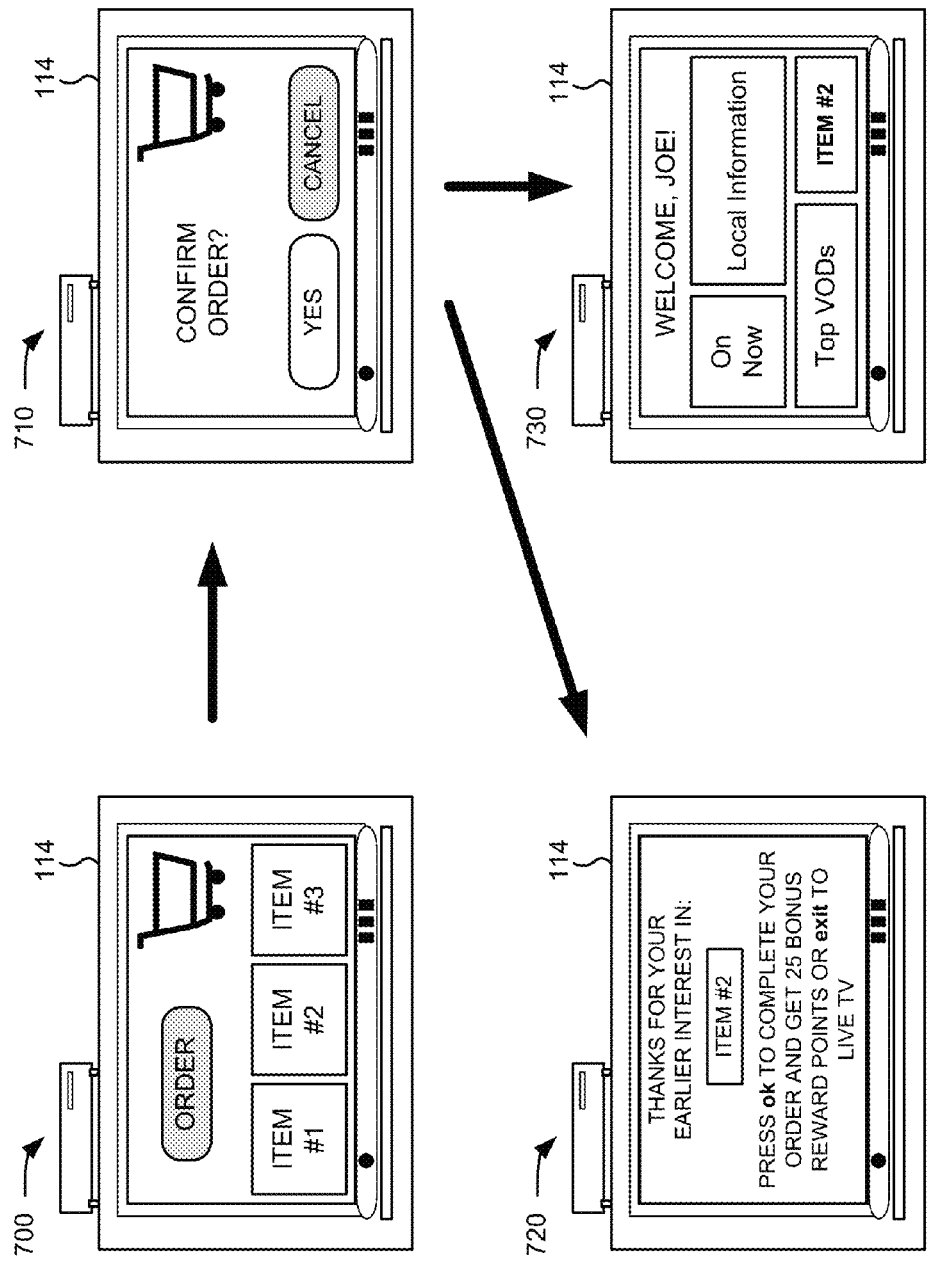

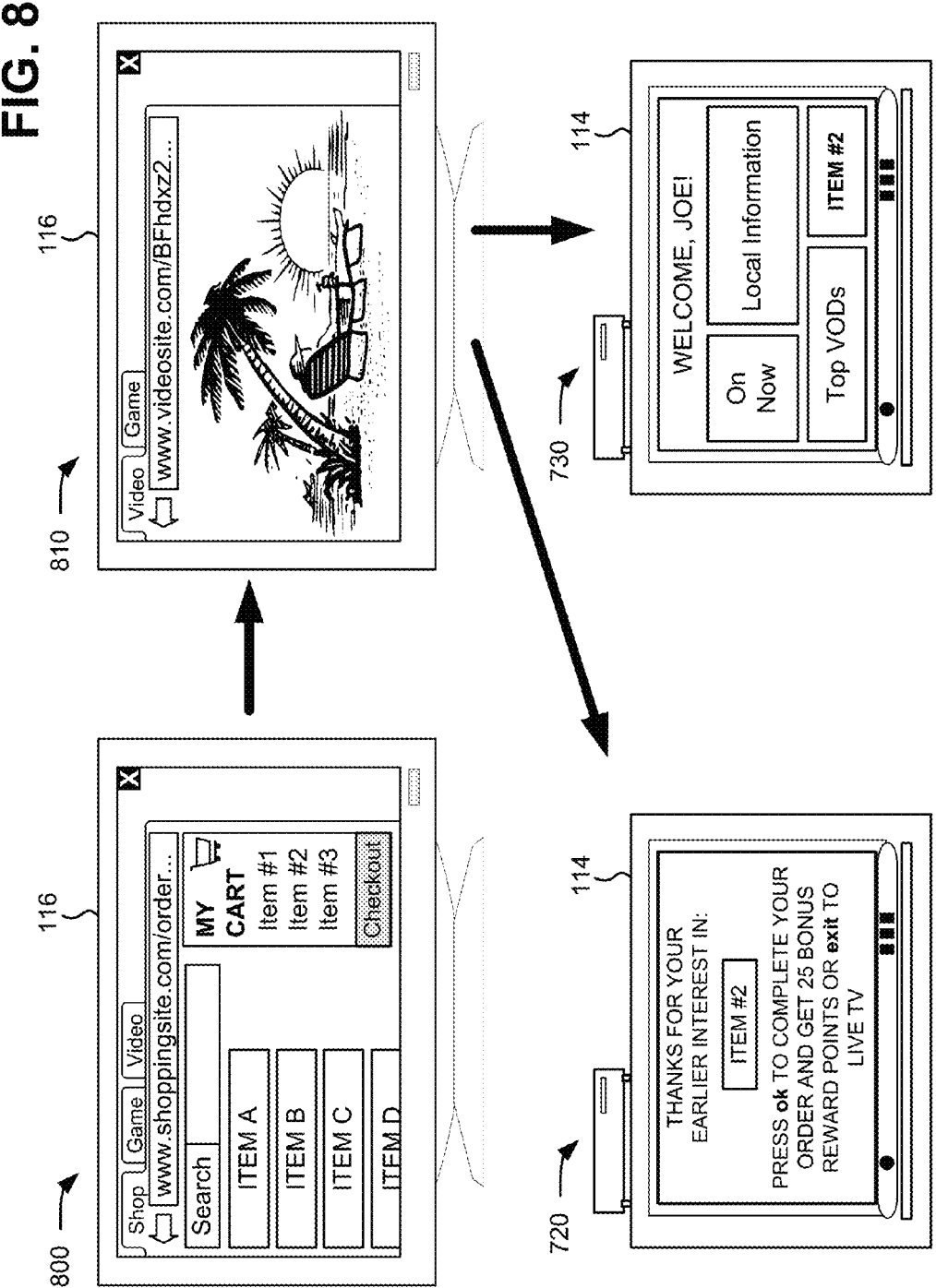

CROSS-PLATFORM ELECTRONIC SHOPPING CART

BACKGROUND

A multi-screen video architecture generally provides cross-platform access to a single content source. Among other benefits, multi-screen video provides users the possibility to watch video on a screen/device of their choice. For example, a live broadcast television event may also be available for viewing on various types of mobile devices. The different platforms (e.g., combinations of access networks and user devices to utilize the access networks) provide users with different types of user interfaces to order and receive available content services.

BRIEF DESCRIPTION OF THE DRAWINGS

FIGS. 7 and 8 are diagrams of exemplary use cases according to implementations described herein.

DETAILED DESCRIPTION OF PREFERRED EMBODIMENTS

Figure 1:
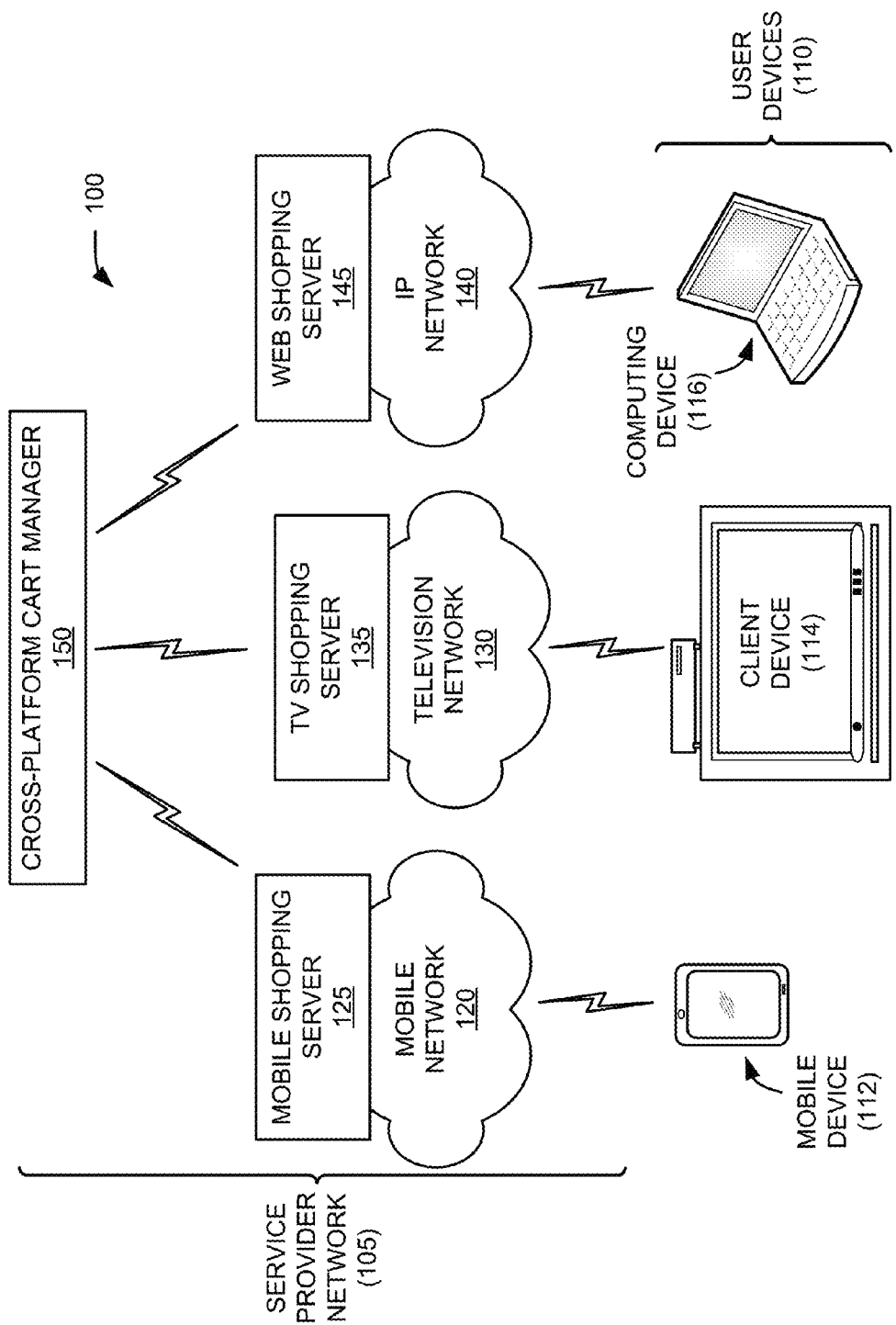
FIG. 1 is an exemplary network in which systems and/or methods described herein may be implemented.

The following detailed description refers to the accompanying drawings. The same reference numbers in different drawings may identify the same or similar elements.

Systems and methods described herein provide for dynamic management of electronic shopping carts across different network access platforms. Network access platforms may include, for example, mobile platforms (e.g., providing content/services over a mobile wireless network to mobile devices, such as smart phones and tablets), television platforms (e.g., providing content/services over a closed distribution network, such as a cable television network with set-top boxes or conditional access modules), and web platforms (e.g., providing content/services to connected devices over wired Internet protocol (IP) networks). A service provider may store abandoned electronic shopping cart entries of a user (also referred to herein as a "customer") and use data from the abandoned shopping carts to target upsell opportunities when the user accesses any one of the platforms at a later time or when the user opens an electronic shopping cart (for the same service provider) within a different platform.

A customer building a cart (e.g., selecting items for potential purchase) using any one platform may abandon the cart, without performing a transaction, for any of a variety of reasons. According to implementations described herein, the cart contents may be stored and presented to the customer in another platform. For example, the customer may abandon an active cart on a mobile platform and the same customer may be offered the option to retrieve the cart when the customer later uses a subscription television platform. The cart contents may be presented with a format and user interface optimized for a particular platform. In one implementation, multiple cart items may be prioritized and/or emphasized to the customer based on take rates (or other consumer response data) associated with a particular platform.

According to another aspect, experiences may be added to enhance cart items that are retrieved in different platforms. For example, an abandoned cart from a mobile platform may be later presented in web platform or television platform. Features that might not be supported in the mobile platform could be presented to the customer when the cart items are presented in a different platform to take advantage of particular platform features (e.g., increased device screen space, higher available bandwidth, more processing power, different network connections, etc.)

According to one implementation, a network device may receive selected items for an electronic shopping cart as selected by a user. The electronic shopping cart is created via a first access network platform (such as a mobile access network platform). The network device may identify an abandonment of the electronic shopping cart and may automatically store the selected items associated with a user account for the user to create stored cart items. The network device may later receive a cart inquiry indicating that the user has accessed a second access network platform (such as a television access network platform) and may associate the stored cart items with the user on the second access network platform. The network device may determine a highest priority item of the stored cart items based on the second access network platform, may generate promotional instructions for presenting the highest priority item to the user on the second network platform, and may send the promotional instructions to the second access network platform.

FIG. 1 is an exemplary network environment 100 in which systems and/or methods described herein may be implemented. As illustrated, network environment 100 may include user devices 110 (collectively "user devices 110" and generically "user device 110") in communication with a service provider network 105. Service provider network 105 may include different access networks to support services for different types of platforms, such as a mobile network 120 with a mobile shopping server 125, a television network 130 with a television shopping server 135, and an Internet Protocol (IP) network 140 with a web shopping server 145. Service provider network 105 may also include a cross-platform cart manager 150. Generally, service provider network 105 may provide telecommunications services to user devices 110. For example, service provider network 105 may provide, among other services, subscription-based services for access to video content, data plans, and the like.

User devices 110 may include various types of consumer electronic devices used to access services and/or present content from service provider network 105. User devices 110 may communicate via one or more of mobile network 120, television network 130, and IP network 140 (or any combination of these networks) to consume services on different platforms. For example, user devices 110 may include a mobile device 112 that may provide a relatively small form-factor. Examples of mobile device 112 may include a smart phone, a tablet computer, a wearable computer, or a portable gaming device.

User devices 110 may also include a closed client device 114 for receiving video/data over a closed distribution network (such as a fiber optic or satellite network). Examples of client device 114 may include a set-top box (STB) with a television, a cable card with a computing device, or a conditional access module (CAM) included with another device.

In another implementation, computing device 116 may be another type of user device 110. Computing device 116 may include a computing or communication device to facilitate wired or a combination of wired and wireless communications over IP network 140. Examples of computing device 116 may include a personal computer, a gaming console, a digital media console, etc.

Mobile network 120 may include a cellular network, the Public Land Mobile Network (PLMN), a second generation (2G) network, a third generation (3G) network, a fourth generation (4G) network (e.g., a long term evolution (LTE) network), a fifth generation (5G) network, a code division multiple access (CDMA) network, a global system for mobile communications (GSM) network, a general packet radio services (GPRS) network, a combination of the above networks, and/or another type of wireless network. Additionally, mobile network 120 may include a local area network (LAN), a wide area network (WAN), a metropolitan area network (MAN), an ad hoc network, an intranet, the Internet, a fiber optic-based network (e.g., a fiber optic service network), a satellite network, a television network, and/or a combination of these or other types of networks.

Mobile shopping server 125 may include one or more computing devices to facilitate electronic shopping. For example, mobile shopping server 125 may present to a user of mobile device 112 a catalog of available services and/or content associated with service provider network 105. In one implementation, the available services and/or content may be specifically targeted to uses by mobile device 112 (e.g., within mobile network 120). In another implementation, the available services and/or content may be relevant for different platforms within service provider network 105. For example, mobile shopping server 125 may present bundled packages that have services/content for use with television network 130 and/or IP network 140. Examples of items in the catalog of available services may include access rights to digital content (e.g., video-on-demand, streaming media content, etc.), Internet access services (e.g., with different guaranteed bit rates), telephone services, television subscription services (e.g., with different content packages), and mobile wireless services (e.g., with different service plans, devices, etc.).

Mobile shopping server 125 may allow a user of mobile device 112 to add particular items from the catalog to an electronic shopping cart for potential purchase. For example, mobile shopping server 125 may provide a user interface that allows a user to select an item or group of items for which to conduct a single aggregated transaction. According to implementations described herein, mobile shopping server 125 may track and record the items a user selects for their particular electronic shopping cart.

Television network 130 may include a closed access network for a subscription television service. A closed access network may include, for example, cable, optical fiber, satellite, or virtual private networks that restrict unauthorized access to and alteration of content delivered by a service provider. In one implementation, the network may include a closed access network to provide content for authorized channels with a guaranteed quality of service (QoS). In one implementation, access to content/services from television network 130 may be limited to particular devices, such as closed client device 114 or other device with proprietary access systems.

Similar to mobile shopping server 125, television shopping server 135 may include one or more computing devices to facilitate electronic shopping. For example, television shopping server 135 may present to a user of client device 114 a catalog of available services and/or content associated with service provider network 105. In one implementation, the available services and/or content may be specifically targeted to uses by client device 114 (e.g., within television network 130). In another implementation, the available services and/or content may be relevant for different platforms within service provider network 105. For example, television shopping server 135 may present bundled packages that have services/content for use with mobile network 120 and/or IP network 140.

Television shopping server 135 may allow a user of client device 114 to add particular items from the catalog to an electronic shopping cart for potential purchase. For example, television shopping server 135 may provide a user interface (e.g., accessible via a STB, television display, and remote control) that allows a user to select an item or group of items for which to conduct a single aggregated transaction. According to implementations described herein, television shopping server 135 may track and record the items a user selects for their particular electronic shopping cart.

IP network 140 may include a local area network (LAN), a wide area network (WAN), a public IP network (such as the Internet), or a combination of the Internet and a private WAN, etc. that is used to transport data. In one implementation, IP network 140 may include a managed network that can be used to provide guaranteed service rates and QoS to user devices 110. Although shown as a single element in FIG. 1, IP network 140 may include a number of separate networks that provide services to user devices 110.

Similar to mobile shopping server 125 and television shopping server 135, web shopping server 145 may include one or more computing devices to facilitate electronic shopping. For example, web shopping server 145 may present to a user of computing device 116 a catalog of available services and/or content associated with service provider network 105. In one implementation, the available services and/or content may be specifically targeted to uses by computing device 116 (e.g., within IP network 140). In another implementation, the available services and/or content may be relevant for different platforms within service provider network 105. For example, web shopping server 145 may present bundled packages that have services/content for use with mobile network 120 and/or television network 130.

Web shopping server 145 may allow a user of computing device 116 to add particular items from the catalog to an electronic shopping cart for potential purchase. For example, web shopping server 145 may provide a user interface (e.g., accessible via a STB, television display, and remote control) that allows a user to select an item or group of items for which to conduct a single aggregated transaction. According to implementations described herein, web shopping server 145 may track and record the items a user selects for their particular electronic shopping cart.

Cross-platform cart manager 150 may include a computing device or network device to retrieve and distribute abandoned cart information to and from mobile shopping server 125, television shopping server 135, and web shopping server 145. For example, cross-platform cart manager 150 may identify an abandoned cart generated using one platform and provide a listing of items from the cart to one or more other platforms. Cross-platform cart manager 150 may apply one or more items from the abandoned cart to an advertising feature on another platform. The selection of item advertising for presentation on other platforms may be based on a correlation between the item(s) in the cart and the type of platform. For example, in selecting from multiple cart items to prioritize, cross-platform cart manager 150 may identify an item with a highest historical take-rate (i.e., users purchased the item) for the current platform.

Cross-platform cart manager 150 may also use distributed abandoned cart information to provide additional experiences in a platform. The additional experiences may be used to enhance the product offering associated with a cart item. For example, a customer may add a new premium television channel to a cart using computing device 116 and abandon/save the cart without completing an order. The same customer may be shown the cart selection on a home screen when using client device 114, along with an additional option of a free preview of the television channel (e.g., for a limited amount of time). In another example, a high-speed Internet service option added to a cart via client device 114 may be advertised along with a free trial in a welcome page when the user logs into an account with computing device 116.

In another implementation, cross-platform cart manager 150 may be a distributed component. For example, functions of cross-platform cart manager 150 may be distributed among mobile shopping server 125, television shopping server 135, and web shopping server 145, without requiring a separate device for cross-platform cart manager 150. In another implementation, cross-platform cart manager 150 may be included within a wide area network (WAN) or backbone network (not shown) that facilitates communication between mobile network 120, television network 130, and IP network 140.

In FIG. 1, the particular arrangement and number of components of network environment 100 are illustrated for simplicity. In practice there may be more sub-networks, server devices, or other devices. For example, content distribution systems, backbone networks and other components are not illustrated in FIG. 1 for simplicity. Generally, components of network environment 100 may be connected via wired and/or wireless links.

Figure 2:
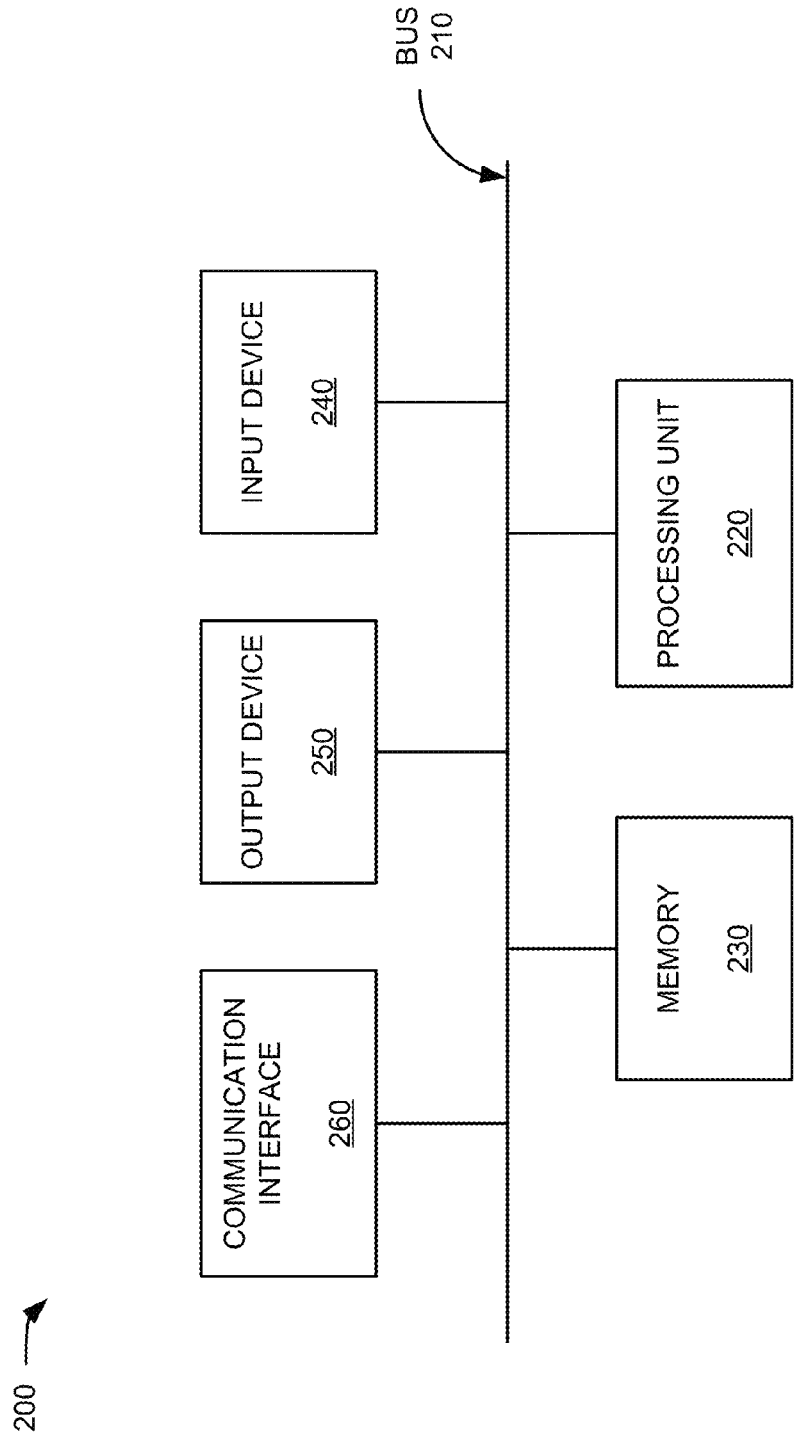
FIG. 2 is a block diagram of exemplary components of a device that may correspond to one of the devices of FIG. 1.

FIG. 2 is a diagram of exemplary components of a device 200. Each of user device 110, mobile shopping server 125, television shopping server 135, web shopping server 145, and/or cross-platform cart manager 150 may be implemented/installed as software, hardware, or a combination of hardware and software, on one or more of device 200. In one implementation, device 200 may be configured as a network device. In another implementation, device 200 may be configured as a computing device. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices of system 100.

As described herein, device 200 may perform certain operations in response to processing unit 220 executing software instructions contained in a computer-readable medium, such as memory 230. A computer-readable medium may include a tangible, non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than depicted in FIG. 2. As an example, in some implementations, a display may not be included in device 200. In these situations, device 200 may be a "headless" device that does not include an input device. Alternatively, or additionally, one or more components of device 200 may perform one or more other tasks described as being performed by one or more other components of device 200.

Figure 3:
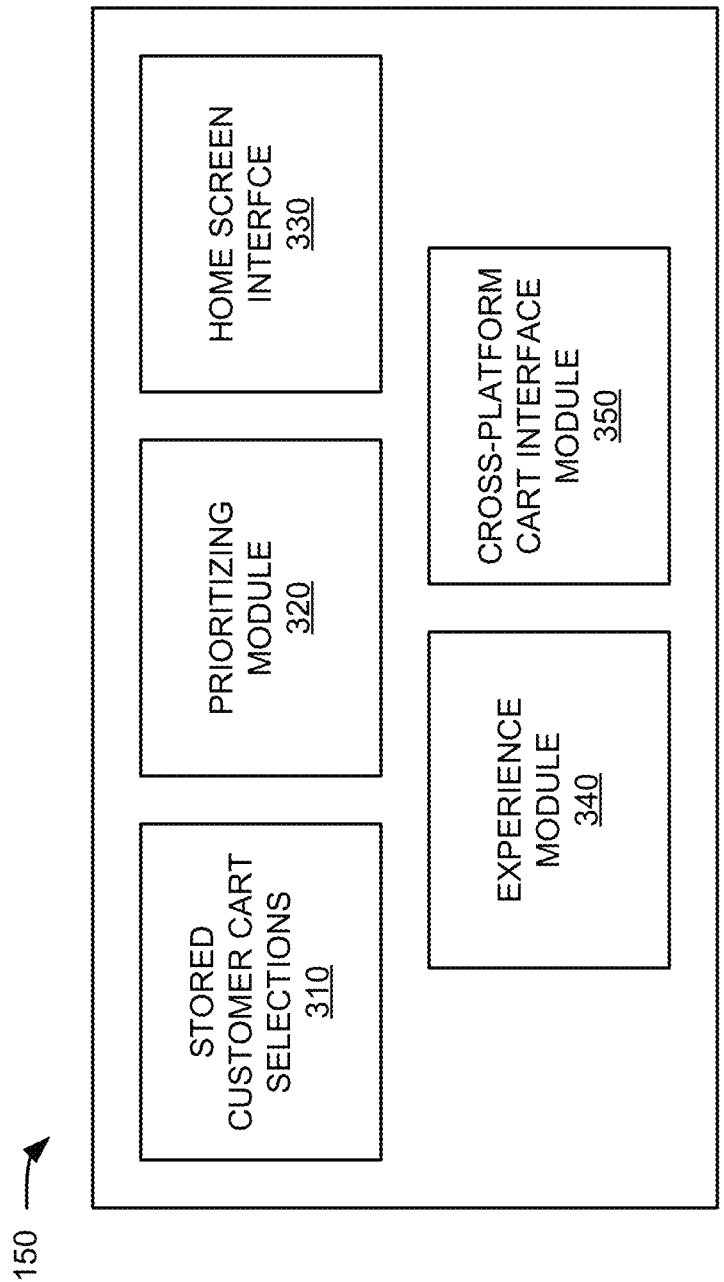
FIG. 3 is a block diagram of exemplary communications among devices in a portion of the network of FIG. 1.

FIG. 3 is a block diagram of exemplary functional components of cross-platform cart manager 150. The functions described in connections with FIG. 3 may be performed by one or more components of device 200 (FIG. 2). As shown in FIG. 3, cross-platform cart manager 150 may include stored customer cart selections 310, prioritizing module 320, home screen interface module 330, experience module 340, and cross-platform cart interface module 350.

Customer cart selections 310 may store user input of abandoned cart selections received from any of mobile shopping server 125, TV shopping server 135, or IP shopping server 145. Generally, customer cart selections 310 may include cart items associated with a user identifier, account identifier, or device identifier that enables items in customer cart selections 310 to be associated with a user when the user accesses any one of mobile network 120, television network 130, or IP network 140. In one implementation, customer cart selections 310 may include a database or a flat file structure. In another implementation, customer cart selections 310 may store links or indicators where cart selections from a user can be retrieved. For example, customer cart selections 310 may store links of cart listings (associated with a user) to mobile shopping server 125, TV shopping server 135, and/or IP shopping server 145.

Prioritizing module 320 may identify abandoned cart items to emphasize in advertising on particular platforms. In one implementation, prioritizing module 320 may receive an indication that a user has accessed a particular network using one of mobile device 112, client device 114, or computing device 116. Prioritizing module 320 may identify what abandoned cart items (if any) are associated with the user based on user ID or a cross-reference lookup in stored customer cart selections 310. Prioritizing module 320 may determine a best match of an abandoned cart item with a current platform.

In one implementation, prioritizing module 320 may apply known take-rate information (e.g., relative to other users)

associated with different types of products/services to select a best match. For example, assume PA, PB, and PC are three products that are offered through electronic shopping at any of mobile shopping server 125, TV shopping server 135, and IP shopping server 145. Further assume that the take rates (TR) on mobile network 120 are TRPA>TRPB>TRPC; the take rates on IP network 140 are TRPB>TRPA>TRPC; and the take rates on television network 130 are TRPC>TRPA>TRPB. If products PA, PB, and PC are in a user's abandoned cart list, prioritizing module 320 may identify PC as a featured item when a user accesses television network 130 and may identify PB as a featured item when the same user accesses IP network 140. When the user accesses mobile network 120, prioritizing module 320 may identify PA as the featured item. In other implementations, prioritizing module 320 may apply additional algorithms that apply take rate data, along with other information, to identify featured items from abandoned cart lists. In still other implementations, prioritizing module 320 may identify a best consumption match between stored cart items and a current viewing platform to identify a featured item from a user's abandoned cart list.

Home screen interface module 330 may identify a platform being used by a user and determine how an advertisement/promotion related to an abandoned cart item (such as a featured item identified by prioritizing module 320) may be presented. For example, home screen interface module 330 may identify if a splash screen or pop-up window can be used for one of mobile device 112, client device 114, or computing device 116. Additionally, or alternatively, home screen interface module 330 may determine if an advertisement/promotion for a featured item may be included in dedicated advertising space for a home screen, welcome page, etc. In one implementation, home screen interface module 330 may select an advertisement/promotion (e.g., for a particular item and platform combination) from a stored group of available advertisement/promotion options for different content items and different platforms.

Experience module 340 may identify experiences to present that will enhance promotion of featured cart items on available platforms. For example, experience module 340 may include a list or catalog of available promotions for particular platforms and products. Experience module 340 may identify a platform being used by a user and determine if an experience-based promotion related to an abandoned cart item (such as a featured item identified by prioritizing module 320) may be presented. Experiences may include, for example, a sample or trial of a featured item on a relevant platform. Thus, a high-speed internet package featured from customer cart selections 310 could be promoted with a free trial when experience module 340 identifies that a user has accessed IP network 140. Similarly, a premium television channel package from customer cart selections 310 could be promoted with a thumbnail view of current programming or a limited trial period when experience module 340 identifies that a user has accessed television network 130.

Cross-platform cart interface module 350 may provide a communication interface between cross-platform cart manager 150 and mobile shopping server 125, TV shopping server 135, or IP shopping server 145. In one implementation, cross-platform cart interface module 350 may receive abandoned cart data from mobile shopping server 125, TV shopping server 135, or IP shopping server 145 and store the received information in stored customer cart selections 310. In another implementation, cross-platform cart interface module 350 may receive promotional instructions, featured items, and/or experiences from prioritizing module 320, home screen interface 330, and/or experience module 340 and provide compiled instructions to a relevant network (e.g., the mobile network 120, television network 130, or IP network 140 currently being accessed by a particular user) for eventual presentation of a featured item to a user.

Although FIG. 3 shows exemplary functional components of cross-platform cart manager 150, in other implementations, cross-platform cart manager 150 may include fewer components, different components, or additional components than depicted in FIG. 3. Alternatively, or additionally, one or more functional components of cross-platform cart manager 150 may be performed by or in conjunction with another device of service provider network 105.

Figure 4:
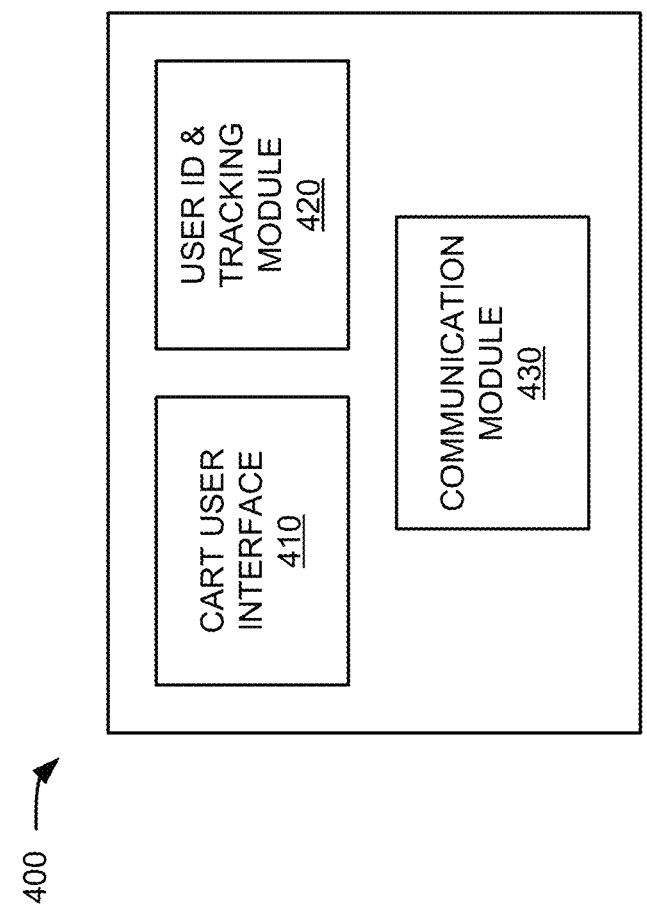
FIG. 4 is a block diagram of exemplary functional components of the cross-platform cart manager of FIG. 1.

FIG. 4 is a block diagram of exemplary functional components of a device 400 that may correspond to any of mobile shopping server 125, TV shopping server 135, or IP shopping server 145. The functions described in connections with FIG. 4 may be performed by one or more components of device 200 (FIG. 2). As shown in FIG. 4, device 400 may include a cart user interface 410, a user identification and tracking module 420, and a communication module 430.

Cart user interface 410 may provide a user interface for presentation of electronic shopping options on user devices 110 (or, alternatively, instructions to cause user devices 110 to present a user interface). In one implementation, cart user interface 410 may provide a searchable catalog of items (e.g., products or services) available for purchase using user device 110. Cart user interface 410 may provide a different type of user interface presentation for different types of user devices 110 (e.g., mobile device 112, client device 114, and computing device 116). Cart user interface 410 may allow a user of user device 110 to select items for potential purchase. In some implementations, the user interface may include presentation of a featured item as selected/instructed by cross-platform cart manager 150. The featured item may include an item from an abandoned cart during a previous session (e.g., on the same or a different user device 110) and/or a promotion based on an item from an abandoned cart.

User identification and tracking module 420 may log shopping cart item selected by a user and associate the selected items with unique identifier associated with the user (a user ID, a device ID, an account ID, etc.). In one implementation, user identification and tracking module 420 may track timing of selections, device types, cart saves, cart exit (abandon) operations, and other data associated with a customer's electronic cart use. In another implementation, user identification and tracking module 420 may update stored cart item lists to remove an item(s) when an order is placed by a customer.

Communication module 430 may provide a communication interface to upload cart information from user devices 110 (e.g., as collected by user identification and tracking module 420) to cross-platform cart manager 150, other networks (e.g., mobile network 120, television network 130, or IP network 140), and/or other devices 400 (e.g., mobile shopping server 125, TV shopping server 135, or IP shopping server 145).

Although FIG. 4 shows exemplary functional components of device 400, in other implementations, device 400 may include fewer components, different components, or additional components than depicted in FIG. 4. Alternatively, or additionally, one or more functional components of device 400 may be performed by or in conjunction with another device of service provider network 105.

Figure 5:
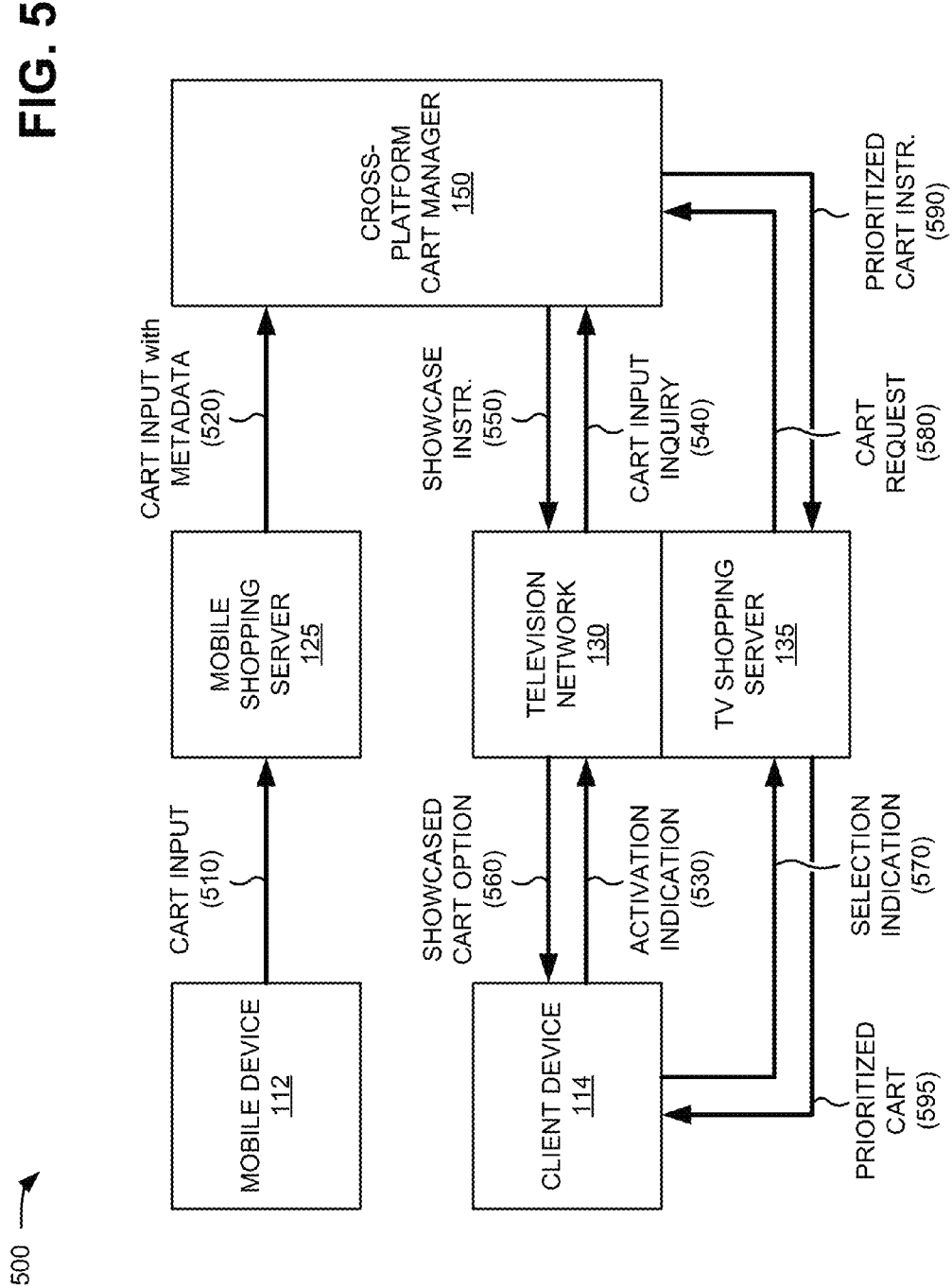
FIG. 5 is a block diagram of exemplary functional components of one of the user devices of FIG. 1.

FIG. 5 is a diagram of exemplary communications for a portion 500 of network environment 100. Communications in FIG. 5 may represent an implementation of a cross-platform upsell using abandoned cart data. As shown in FIG. 5, network portion 500 may include mobile device 112, client device 114, mobile shopping server 125, TV shopping server 135, and cross-platform cart manager 150. Mobile device 112, client device 114, mobile shopping server 125, TV shopping server 135, and cross-platform cart manager 150 may include features described above in connection with, for example, FIGS. 1-4.

As shown in FIG. 5, mobile device 112 may provide cart input 510 to select one or more items available for ordering from service provider network 105. According to implementations described herein, cart input 510 may represent an uncompleted transaction, where a user of mobile device 112 places items in an electronic shopping cart and saves or exits the cart user interface without executing a purchase/transaction. Mobile device 112 may provide cart input 510 to mobile shopping server 125. Mobile shopping server 125 may compile cart input 510 and any related metadata (e.g., a time, user account ID, mobile device ID, etc.) as cart input with metadata 520. Mobile shopping server 125 may provide cart input with metadata 520 to cross-platform cart manager 150.

Cross-platform cart manager 150 may store cart input with metadata 520 in a memory (e.g., memory 230) and associated with other user accounts for the same user, such as accounts for television network 130 and/or IP network 140. In one implementation, a user's accounts for mobile network 120, television network 130, and IP network 140 may be associated with a single user identifier.

At a later point in time, the user may activate client device 114 to obtain content from television network 130. In response to the activation, client device 114 may provide an activation indication 530 to television network 130. In one implementation, activation indication 530 may be automatically provided by client device 114 without user input (e.g., based on a power-up/wake-up command). In another implementation, client device 114 may require express user input (e.g., a user PIN or login procedure) before providing activation indication 530.

Television network 130 may receive activation indication 530 and, in response, may initiate a cart input inquiry 540 to cross-platform cart manager 150. Cart input inquiry 540 may identify, for example, a user ID or a device ID associated with client device 114. In some implementations, cart input inquiry 540 may also include an indication of a type of user interface (e.g., a splash screen, home page section, banner, etc.) where advertising/promotional space is available. Cart input inquiry 540 may be received by cross-platform cart manager 150 and cause cross-platform cart manager 150 to search for cart input, associated with the user, from any platform (e.g., any of mobile network 120, television network 130, or IP network 140). In the example of FIG. 5, cart input inquiry 540 may cause cross-platform cart manager 150 to identify cart input with metadata 520 for the same user that relates to activation indication 530.

Upon finding cart input associated with the user, cross-platform cart manager 150 (e.g., prioritizing module 320) may identify if any of the stored cart items should receive priority advertising for the user's current platform (e.g., client device 114). In one implementation, cross-platform cart manager 150 may identify a higher priority item based on a take-rate for the current platform. In another implementation, cross-platform cart manager 150 may identify a higher priority item based on a best consumption match for the current platform.

In still another implementation, cross-platform cart manager 150 (e.g., experience module 340) may identify an experience (such as a preview, a free trial, a bonus offer, etc.) that can be included within the current user interface for client device 114 or presented in place of the current user interface. For example, cross-platform cart manager 150 may identify an offer from a list of available upsell offers that correspond to an item in cart input with metadata 520. Cross-platform cart manager 150 may identify a presentation format for the experience that is useable with the current platform (e.g., client device 114 using television network 130). In another implementation, cross-platform cart manager 150 may provide instructions to present an experience associated with one aspect of a set of bundled services that is particularly applicable to a current platform. For example, a store cart item with a bundle of services that includes high-speed Internet may be enhanced with a free trial for the high-speed Internet access when the user is using IP network 140 and computing device 116. Conversely, a bundle with a premium television channel may be enhanced with a free preview or current thumbnail view of the premium television channel when the user is using television network 130 and client device 114.

Cross-platform cart manager 150 may assemble the cart item, priority information, and/or experience information as showcase instructions 550 and provide showcase instructions 550 to television network 130. Television network 130 may incorporate showcase instructions 550 into a current, modified, or replacement user interface for client device 114 that includes showcased cart options 560.

As further shown in FIG. 5, presentation of showcased cart option 560 may result in the user selecting the showcased cart option via client device 114. The user's selection may cause client device 114 to provide selection indication 570 to television shopping sever 135. In response to selection indication 570, television shopping sever 135 may generate a cart request 580 to request instructions for presentation of an electronic shopping cart on client device 114. Cross-platform cart manager 150 may receive cart request 580 and may rank the corresponding stored cart items for the user. In one aspect, cross-platform cart manager 150 may also identify experiences and/or other promotions that may be included with the cart presentation on the user's current platform. In one implementation, cross-platform cart manager 150 (e.g., prioritizing module 320 and/or experience module 340) may apply a ranking process using take-rates and/or other information, similar to that described above in connection with showcase instructions 550. Cross-platform cart manager 150 may provide the ranked cart items (along with additional instruction for experiences, etc.) to television shopping server 135 as prioritized cart instructions 590. Television shopping sever 135 may receive prioritized cart instructions 590 and, in response, provide a prioritized cart 595 to client device 114 for presentation. Prioritized cart 595 may include an order of items and additional experiences customized for the particular user on the particular access platform.

Although FIG. 5 shows exemplary communications within network portion 500, in other implementations, network portion 500 may include fewer components, different components, differently-arranged components, and/or additional components than depicted in FIG. 5. Alternatively, or additionally, one or more components of network portion 500 may perform one or more other communications described as being performed by one or more other components of network portion 500.

Figure 6:
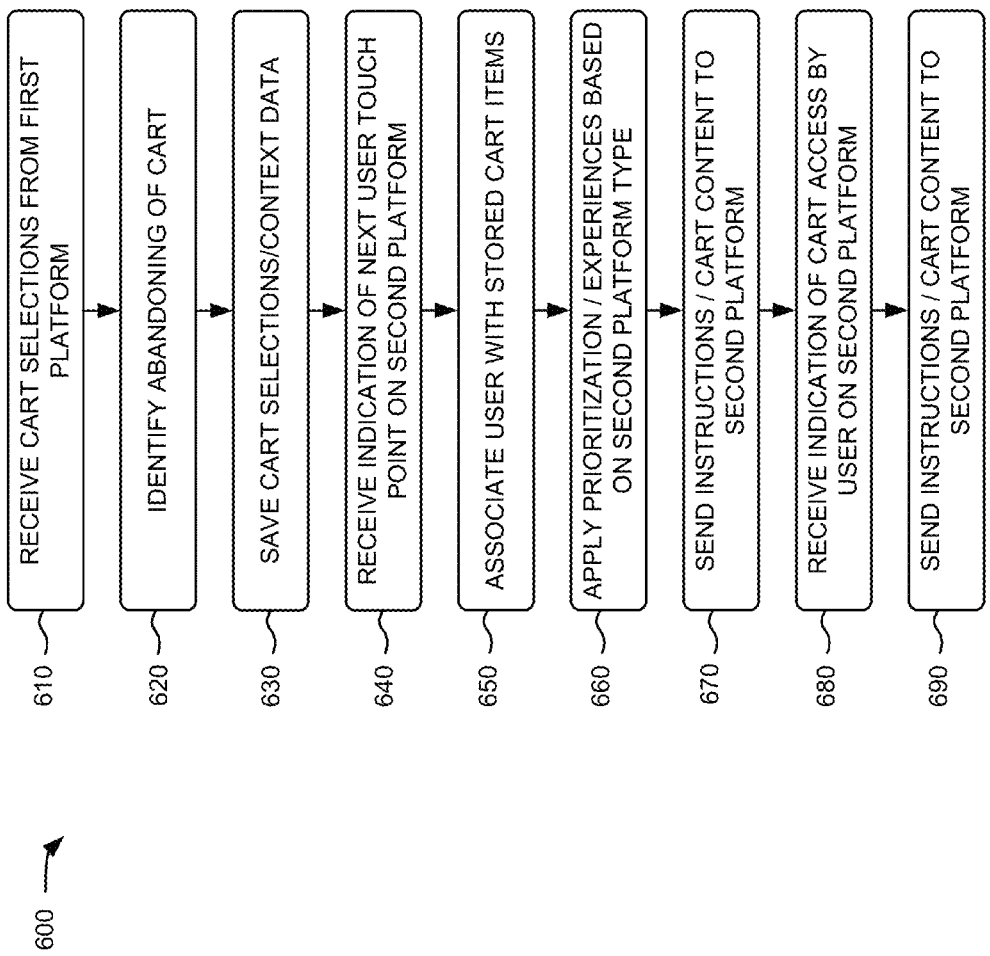
FIG. 6 is a flow diagram of an exemplary process for implementing a cross-platform electronic shopping cart, according to an implementation described herein.

FIG. 6 is a flow diagram of an exemplary process 600 for implementing a cross-platform electronic shopping cart, according to an implementation described herein. In one implementation, process 600 may be performed by cross-platform cart manager 150. In other implementations, process 600 may be performed by cross-platform cart manager 150 and one or more other devices from service provider network 105.

Process 600 may include receiving selected items for an electronic shopping cart associated with a first access network platform (block 610), identifying an abandonment of the electronic shopping cart (block 620), and storing the selected items associated with a user account for the user (block 630). For example, a user device 110 (such as mobile device 112 in FIG. 5) may receive input for an electronic shopping cart to select one or more items available for ordering from service provider network 105. The user may abandon the cart interface without executing a purchase/transaction. As described in FIG. 5, mobile device 112 may provide cart input 510 with the abandoned cart data to mobile shopping server 125. Mobile shopping server 125 may compile cart input 510 and any related context information (e.g., a time, user account ID, mobile device ID, etc.) as cart input with metadata 520. Mobile shopping server 125 may then provide cart input with metadata 520 to cross-platform cart manager 150 for storage and later retrieval.

Process 600 may also include receiving indication that the user has accessed a second platform (block 640) and associating the user on the second platform with the stored cart items (block 650). For example, at a later point in time, the user may activate a user device 110 on a different platform (e.g., client device 114 on television network 130). The user device 110 may provide an activation indication to the corresponding access network. In the example of FIG. 3, client device 114 may provide activation indication 530 to television network 130, which may in turn generate cart input query 540 for cross-platform cart manager 150. Cross-platform cart manager 150 may receive cart input query 540 and search for cart input, associated with the user, from any platform (e.g., any of mobile network 120, television network 130, or IP network 140).

Process 600 may further include applying prioritization and/or experiences to the stored cart items based on the second platform type (block 660) and sending promotional instructions to the second access network platform. For example, cross-platform cart manager 150 may determine a highest priority item of the stored cart items based on the second access network platform currently being used by the user. The priority may be based on a functionality of the platform (e.g., a certain cart item may only be utilized on a particular type of platform), a take rate (for each cart item) when using the platform, a capability of the platform to provide enhanced experiences associated with a cart item, or other factors based on the type of platform in combination with other factors (e.g., user profile data, etc.). In some instances, cross-platform cart manager 150 may also identify experiences that may be added to the presentation of the highest priority item to enhance a product offering. Based on an identified highest priority item, cross-platform cart manager 150 may generate promotional instructions for featuring the highest priority item to the user on the second network platform. The instructions may include, for example, instructions to feature the highest priority item in a splash page, in a pop-up window, in a dedicated advertisement space, etc.

Process 600 may additionally include receiving an indication of a cart access by the user on the second platform (block 680) and sending cart presentation instructions to the second platform based on the prioritization and/or experiences (block 690). For example, selection of a featured item by a user may cause user device 110 (e.g., client device 114) to provide an indication of the selection (e.g., selection 570) to a corresponding shopping server (e.g., television shopping sever 135). In response to selection 570, television shopping sever 135 may generate a cart request 580 to request instructions for presentation of an electronic shopping cart on the user's current platform (e.g., using television network 130). Cross-platform cart manager 150 may receive cart request 580 and rank the corresponding cart items for the user. In one aspect, cross-platform cart manager 150 may also identify experiences and/or other promotions that may be included with the cart presentation on the user's current platform. Cross-platform cart manager 150 may provide the ranked cart items (along with additional instruction for experiences, etc.) to television shopping server 135 as prioritized cart instructions 590.

FIG. 7 provides a diagram of an exemplary use case according to implementations described herein. More particularly, FIG. 7 discloses a series of exemplary screen displays for a promoting an abandoned cart item in a homogeneous platform. As shown in screen display 700, a customer may select multiple items (e.g., "Item #1," "Item #2," and "Item #3") to add to an electronic shopping cart via a user device 110 (e.g., client device 114). As shown in screen display 710, after selecting the multiple items, the customer cancels his or her order. The multiple items are automatically saved (e.g., by television shopping server 135 and/or cross-platform cart manager 150, not shown).

At a later point in time, the customer may return to use client device 114. The customer's activation of client device 114 and/or a login procedure, may cause devices in service provider network 105 (e.g., cross-platform cart manager 150) to identify the abandoned cart items (e.g., "Item #1," "Item #2," and "Item #3") and to select a particular item to feature. The selected featured item may be presented in one or more of types of user interfaces, such as a splash screen (screen display 720) or a home screen (screen display 730).

For example, as shown in screen display 720, "Item #2" may be featured in a splash screen based on, for example, a take rate associated with the particular item/user device combination (over other possible item/user device combinations for the abandoned cart items). In one implementation, devices in service provider network 105 may also identify an experience to help promote the featured item. As shown in screen display 720, an experience may include a bonus offering (e.g., "25 bonus points").

As shown in screen display 730, "Item #2" also may be featured in a home screen. In one implementation, devices in service provider network 105 may also identify a location and format to promote the featured item ("Item #2) within the home screen. As shown in screen display 730, the featured item may be included within a selectable menu option (e.g., using a remote control and EBIF-type interface). In one implementation, the featured item may include a live preview of available content, a data-driven icon associated with the featured item, or descriptive information.

FIG. 8 provides a diagram of another exemplary use case according to implementations described herein. More particularly, FIG. 8 discloses a series of exemplary screen displays for a promoting an abandoned cart item in a heterogeneous platform. As shown in screen display 800, a customer may select multiple items (e.g., "Item #1," "Item #2," and "Item #3") to add to an electronic shopping cart via a user device 110 (e.g., computing device 116) executing a web browser. As shown in screen display 810, after selecting the multiple items, the customer cancels his order by closing the corresponding web browser tab. The multiple items are automatically saved (e.g., by web shopping server 135 and/or cross-platform cart manager 150, not shown).

At a later point in time, the customer may begin to use client device 114. The customer's activation of client device 114 and/or a login procedure, may cause devices in service provider network 105 (e.g., cross-platform cart manager 150) to identify the abandoned cart items (e.g., "Item #1," "Item #2," and "Item #3") from the customer's previous activity on computing device 116 and to select a particular item to feature. The selected featured item may be presented in one or more of types of user interfaces appropriate for a television display, such as a splash screen (screen display 720) or a home screen (screen display 730).

In the preceding specification, various preferred embodiments have been described with reference to the accompanying drawings. However various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIG. 6, the order of the blocks may be modified in other implementations. Further, non-dependent blocks may be performed in parallel.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, portions of certain embodiments may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method comprising:
   receiving, by a network device, selected items for an electronic shopping cart as selected by a user, wherein the electronic shopping cart is created through a first access network platform;
   identifying, by the network device, an abandonment of the electronic shopping cart;
   storing, by the network device, the selected items associated with a user account for the user to create stored cart items;
   receiving, by the network device, a cart inquiry indicating the user has accessed a second access network platform;
   associating, by the network device, the stored cart items with the user on the second access network platform;
   determining, by the network device, a highest priority item of the stored cart items based on the second access network platform;
   generating, by the network device, promotional instructions for presenting the highest priority item to the user on the second network platform; and
   sending, by the network device, the promotional instructions to the second access network platform.

2. The method of claim 1, wherein the first access network platform or the second access network includes a subscription television network.

3. The method of claim 1, wherein the first access network platform or the second access network includes a wireless mobile network serving mobile devices or a wired Internet protocol (IP) network.

4. The method of claim 1, wherein the selected items include one or more items from the following types of items:
   access rights to digital content,
   Internet access services,
   telephone services,
   television subscription services, and
   mobile wireless services.

5. The method of claim 1, wherein the selected items include one or more digital content items, and wherein the one or more digital content items can be presented differently on the first access platform and the second access platform.

6. The method of claim 1, wherein the determining further comprises:
   identifying a take rate for each of the stored cart items on the second network platform; and
   assigning a highest priority to one of the stored cart items with a highest take rate for the second network platform.

7. The method of claim 1, further comprising:
   identifying, by the network device, an experience that can be associated with the highest priority item; and
   including, within the promotional instructions, additional instructions to present the experience.

8. The method of claim 1, further comprising:
   receiving, from the network device, an indication of the user's selection of the highest priority item;
   generating, by the network device, prioritized cart instructions for presentation of the highest priority item in an electronic shopping cart on the second access network platform; and
   sending, by the network device, the prioritized cart instructions to the second access network platform.

9. The method of claim 8, wherein the prioritized cart instructions include additional instructions to present an experience, associated with the highest priority item, within a user interface for the electronic shopping cart on the second access network platform.

10. The method of claim 9, wherein the experience includes one or more of:
    a trial of a service associated with the highest priority item, or
    a preview of content associated with the highest priority item.

11. A device, comprising:
    a network interface to communicate with a remote system;

a memory for storing instructions to be executed by a processor; and the processor configured to execute the instructions to:
receive selected items for an electronic shopping cart as selected by a user, wherein the electronic shopping cart is created through a first access network platform;
identify an abandonment of the electronic shopping cart;
store the selected items, associated with a user account for the user, to create stored cart items;
receive a cart inquiry indicating that the user has accessed a second access network platform;
associate the stored cart items with the user on the second access network platform;
determine a highest priority item of the stored cart items based on the second access network platform;
generate promotional instructions for presenting the highest priority item to the user on the second network platform; and
send the promotional instructions to the second access network platform.

12. The device of claim 11, wherein, when storing the selected items, the processor is further configured to execute the instructions to:
associate the stored selected items with a user identifier, a device identifier, or an account identifier that can be cross-referenced against both the first access network platform and the second access network platform.

13. The device of claim 12, wherein the highest priority item includes a set of bundled services.

14. The device of claim 13, wherein the processor is further configured to execute the instructions to:
provide instructions to present an experience, associated with one aspect of the set of bundled services, within a user interface for the electronic shopping cart on the second access network platform, wherein the experience is optimized for features of the second access network platform.

15. The device of claim 11, wherein, when determining the highest priority item of the stored cart items based on the second access network platform, the processor is further configured to execute the instructions to:
identify a take rate for each of the stored cart items on the second network platform; and
assign a highest priority to one of the stored cart items with a highest take rate for the second network platform.

16. The device of claim 15, wherein the processor is further configured to execute the instructions to:
generate prioritized cart instructions for presentation of the highest priority item in an electronic shopping cart on the second access network platform; and
send, via the network interface, the prioritized cart instructions to the second access network platform.

17. The device of claim 16, wherein the prioritized cart instructions include additional instructions to present an experience, associated with the highest priority item, within a user interface for the electronic shopping cart on the second access network platform.

18. A non-transitory computer-readable medium, storing instructions executable by one or more processors, the non-transitory computer-readable medium comprising instructions to:
receive selected items for an electronic shopping cart as selected by a user, wherein the electronic shopping cart is created through a first access network platform;
identify an abandonment of the electronic shopping cart;
store the selected items associated with a user account for the user to create stored cart items;
receive a cart inquiry indicating that the user has accessed a second access network platform;
associate the stored cart items with the user on the second access network platform;
determine a highest priority item of the stored cart items based on the second access network platform;
generate promotional instructions for presenting the highest priority item to the user on the second network platform; and
send the promotional instructions to the second access network platform.

19. The non-transitory computer-readable medium of claim 18, further comprising instructions to:
generate prioritized cart instructions for presentation of the highest priority item in an electronic shopping cart on the second access network platform; and
send the prioritized cart instructions to the second access network platform.

20. The non-transitory computer-readable medium of claim 18, further comprising instructions to:
identify an experience that can be associated with the highest priority item; and
include, within the promotional instructions, additional instructions to present the experience.

* * * * *